(12) United States Patent
Alber et al.

(10) Patent No.: US 10,106,274 B2
(45) Date of Patent: Oct. 23, 2018

(54) TAIL SITTER VEHICLE WITH AERIAL AND GROUND REFUELING SYSTEM

(71) Applicant: Sikorsky Aircraft Corporation, Stratford, CT (US)

(72) Inventors: Mark R. Alber, Milford, CT (US); Charles Gayagoy, Orange, CT (US); Jeffrey Parkhurst, Meriden, CT (US); Glenn D. Tiongson, Shelton, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 533 days.

(21) Appl. No.: 15/070,599

(22) Filed: Mar. 15, 2016

(65) Prior Publication Data

US 2016/0311553 A1    Oct. 27, 2016

Related U.S. Application Data

(60) Provisional application No. 62/140,154, filed on Mar. 30, 2015.

(51) Int. Cl.
| | |
|---|---|
| *B64C 29/02* | (2006.01) |
| *B64D 39/04* | (2006.01) |
| *B64C 39/02* | (2006.01) |
| *B64C 11/28* | (2006.01) |
| *B64C 23/06* | (2006.01) |

(Continued)

(52) U.S. Cl.
CPC ............. *B64D 39/04* (2013.01); *B64C 3/56* (2013.01); *B64C 11/28* (2013.01); *B64C 23/065* (2013.01); *B64C 23/072* (2017.05); *B64C 25/04* (2013.01); *B64C 27/50* (2013.01); *B64C 29/02* (2013.01); *B64C 39/024* (2013.01); *B64D 7/00* (2013.01); *B64D 37/04* (2013.01); *B64D 37/16* (2013.01); *B64D 39/00* (2013.01); *B64D 41/00* (2013.01); *B64C 2201/028* (2013.01); *B64C 2201/063* (2013.01); *B64C 2201/088* (2013.01); *B64C 2201/104* (2013.01); *B64C 2201/108* (2013.01); *B64D 2041/002* (2013.01); *Y02T 50/164* (2013.01); *Y02T 50/44* (2013.01)

(58) Field of Classification Search
CPC ....... B64C 27/605; B64C 27/50; B64C 29/02; B64C 39/024; B64C 11/28; B64C 11/32; B64C 23/072; B64C 23/065; B64C 3/56; B64D 39/04; B64D 39/00
See application file for complete search history.

(56) References Cited

U.S. PATENT DOCUMENTS

| | | | |
|---|---|---|---|
| 3,181,810 A | * | 5/1965 | Olson ................. B64C 29/0033 244/66 |
| 4,540,144 A | | 9/1985 | Perrella |

(Continued)

*Primary Examiner* — Justin M Benedik
(74) *Attorney, Agent, or Firm* — Cantor Colburn LLP (57) ABSTRACT

An aircraft is provided and includes a fuselage, first and second wings extending outwardly from opposite sides of the fuselage, proprotors operably disposed on each of the first and second wings to drive vertical take-off and landing aircraft operations and horizontal flight aircraft operations and a refueling system including at least one fuel tank disposed in at least one or more of the fuselage, the first wing or the second wing and a refueling apparatus. The refueling apparatus is coupled to the at least one fuel tank such that fuel is movable with respect to the at least one fuel tank during aircraft ground and aerial operations.

14 Claims, 5 Drawing Sheets

(51) Int. Cl.
  *B64C 25/04* (2006.01)
  *B64D 37/04* (2006.01)
  *B64D 41/00* (2006.01)
  *B64C 3/56* (2006.01)
  *B64C 27/50* (2006.01)
  *B64D 7/00* (2006.01)
  *B64D 37/16* (2006.01)
  *B64D 39/00* (2006.01)

(56) References Cited

U.S. PATENT DOCUMENTS

| | | | |
|---|---|---|---|
| 5,326,052 A | 7/1994 | Krispin et al. | |
| 5,573,206 A | 11/1996 | Ward | |
| 5,776,341 A | 7/1998 | Barnard | |
| 5,924,445 A | 7/1999 | Ambrose et al. | |
| 6,598,830 B1 | 7/2003 | Ambrose et al. | |
| 6,604,711 B1 | 8/2003 | Stevens et al. | |
| 6,655,631 B2 * | 12/2003 | Austen-Brown | B64C 27/28 244/12.4 |
| 6,926,049 B1 | 8/2005 | Enig et al. | |
| 6,994,294 B2 | 2/2006 | Saggio, III et al. | |
| 7,185,854 B2 * | 3/2007 | Von Thal | B64D 39/00 244/135 A |
| 7,798,449 B2 * | 9/2010 | Small | B64C 39/024 244/1 TD |
| 8,016,238 B2 * | 9/2011 | Padan | B64D 37/12 244/135 C |
| 8,056,860 B2 | 11/2011 | Small et al. | |
| 8,186,623 B2 | 5/2012 | Feldmann | |
| 8,220,746 B1 | 7/2012 | Stecko et al. | |
| 8,453,962 B2 * | 6/2013 | Shaw | B64C 27/20 244/12.4 |
| 8,561,947 B2 * | 10/2013 | Feldmann | B64D 39/06 244/1 TD |
| 8,596,571 B2 * | 12/2013 | Goelet | B64B 1/06 244/13 |
| 8,881,764 B2 | 11/2014 | Smith et al. | |
| 9,102,401 B2 * | 8/2015 | Collins | B64C 29/0033 |
| 9,745,042 B2 * | 8/2017 | Goelet | B64B 1/68 |
| 2005/0178879 A1 * | 8/2005 | Mao | B64C 29/02 244/7 B |
| 2011/0180673 A1 * | 7/2011 | Lim | B64C 27/24 244/7 A |
| 2013/0068889 A1 | 3/2013 | Richardson et al. | |
| 2013/0168497 A1 * | 7/2013 | Rix | B64D 39/00 244/135 A |
| 2014/0252156 A1 | 9/2014 | Hiebl et al. | |

\* cited by examiner

TAIL SITTER VEHICLE WITH AERIAL AND GROUND REFUELING SYSTEM

CROSS-REFERENCE TO RELATED APPLICATION

This application claims priority to U.S. Provisional Patent Application No. 62/140,154 filed on Mar. 30, 2015. The entire contents of which are incorporated herein by its reference.

BACKGROUND OF THE INVENTION

The subject matter disclosed herein relates to a tail sitter vehicle with aerial and ground refueling system and, more particularly, to a tail sitter unmanned aerial vehicle with aerial and ground refueling systems.

Aircraft missions often require VTOL capability that is combined with long range and endurance and can be very demanding. Conventional configurations of such aircraft are designed primarily for efficient forward flight, for efficient vertical lift or a poor compromise solution that permits both forward and vertical flight. Alternatively, some configurations include tilt-wing or tilt-rotor features that allow tilting of the fuselage with respect to the nacelles and have VTOL capabilities, long range and endurance but pay a high penalty in terms of complexity, higher empty weight and other inefficiencies.

One particular configuration is a rotor blown wing (RBW) configuration where a hybrid aircraft can fly as a rotorcraft and as a fixed wing aircraft. In such cases, the availability of fuel has been identified as an emerging tactical need. Currently, some conventional fixed wing and tilt rotor aircraft but not VTOL aircraft can be refueled in flight using large tanker aircraft. Meanwhile, it has long been understood that refueling of ground vehicles and grounded aircraft can be accomplished by using standard fuel tanks.

BRIEF DESCRIPTION OF THE INVENTION

According to one aspect of the invention, an aircraft is provided and includes a fuselage, first and second wings extending outwardly from opposite sides of the fuselage, proprotors operably disposed on each of the first and second wings to drive vertical take-off and landing aircraft operations and horizontal flight aircraft operations and a refueling system including at least one fuel tank disposed in at least one or more of the fuselage, the first wing or the second wing and a refueling apparatus. The refueling apparatus is coupled to the at least one fuel tank such that fuel is movable with respect to the at least one fuel tank during aircraft ground and aerial operations.

In accordance with additional or alternative embodiments, each of the first and second wings includes a main wing, a winglet coupled to a distal end of the main wing and a hinge by which the winglet is pivotable about the distal end of the main wing.

In accordance with additional or alternative embodiments, the proprotors include foldable rotor blades.

In accordance with additional or alternative embodiments, the aircraft further includes alighting elements disposed at a trailing side of the first and second wings for aircraft support during the ground operations.

In accordance with additional or alternative embodiments, the fuselage includes a wing section disposed along a plane of the first and second wings and a bulged section disposed to extend away from the plane.

In accordance with additional or alternative embodiments, the fuselage further includes a stores support coupled to the wing section and an external tank element coupled to a distal end of the stores support.

In accordance with additional or alternative embodiments, the fuselage includes a plurality of stores supports and a corresponding number of external tank elements.

In accordance with additional or alternative embodiments, the plurality of the stores supports and the corresponding number of the external tank elements are arrayed on opposite sides of the plane.

In accordance with additional or alternative embodiments, the refueling apparatus includes an inlet fluidly communicative with the at least one fuel tank.

In accordance with additional or alternative embodiments, the refueling apparatus includes a hose and drogue system fluidly communicative with the at least one fuel tank.

In accordance with additional or alternative embodiments, wherein the hose and drogue system is housed in or on the fuselage.

In accordance with additional or alternative embodiments, an auxiliary power unit is configured to power a fuel transfer between the at least one fuel tank and the refueling apparatus According to another aspect of the invention, an aircraft is provided and includes a fuselage, first and second wings extending outwardly from opposite sides of the fuselage, proprotors operably disposed on each of the first and second wings to drive vertical take-off and landing aircraft operations and horizontal flight aircraft operations and a refueling system including at least one fuel tank disposed in at least one or more of the fuselage, the first wing or the second wing and a refueling apparatus. The refueling apparatus is coupled to the at least one fuel tank such that fuel is movable with respect to the at least one fuel tank during aircraft ground and aerial operations and includes an inlet fluidly communicative with the at least one fuel tank and a hose and drogue system fluidly communicative with the at least one fuel tank In accordance with additional or alternative embodiments, the fuselage includes a wing section disposed along a plane of the first and second wings, a bulged section disposed to extend away from the plane, a plurality of stores supports coupled to opposite sides of the wing section and a plurality of external tank elements respectively coupled to respectively distal ends of each of the stores supports.

In accordance with additional or alternative embodiments, wherein the pluralities of the stores supports and the external tank elements are arrayed on opposite sides of the plane.

In accordance with additional or alternative embodiments, wherein the hose and drogue system is housed in or on the fuselage.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

As will be described below, an aircraft is provided as a vertical take-off and landing (VTOL) aircraft or a tail sitter aircraft that may be a manned or unmanned aerial vehicle. In any case, the aircraft includes a hose and drogue system for refueling, auxiliary fuel tanks (external and/or internal) and an auxiliary power unit (APU) that powers a fuel transfer system. The aircraft thus offers tactical refuel capability for a VTOL aircraft to a battlefield commander with refueling options available for in-flight or grounded operations. The aircraft may further have fold provisions and a corresponding small size that permits operations from small decked ships.

With reference to FIGS. 1-6, a rotor blown wing (RBW) vertical take-off and landing (VTOL) aircraft 10 is provided and may be referred to as a "tail sitter aircraft." The aircraft 10 includes a fuselage 11 that generally has an aerodynamic shape with a nose section, a trailing end opposite from the nose section and an airframe. The airframe is generally smooth but may include sensor components protruding into or out of the airframe. The airframe may or may not have a dorsal fin or horizontal or vertical stabilizer elements. The airframe has first and second opposite sides 114 and 115 and is formed and sized to encompass at least one or more of aircraft electronic components, payload elements and fuel in accordance with mission requirements. Although the fuselage 11 is illustrated as having a blunted nose, it is to be understood that other shapes (e.g., delta-wing shapes) are possible as will be discussed below.

Figure 2:
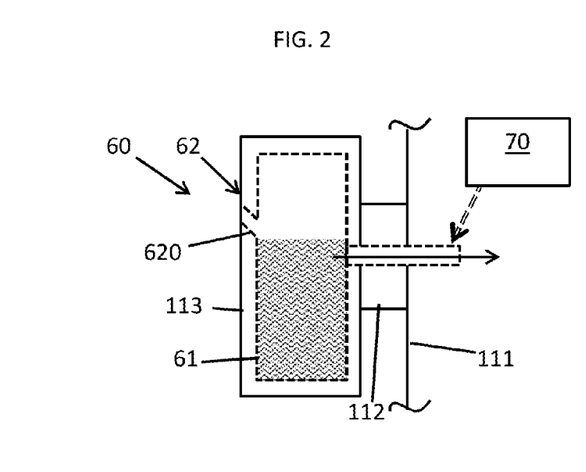
FIG. 2 is a schematic illustration of a portion of a refueling apparatus of the VTOL of FIG. 1.

The aircraft 10 further includes first and second wings 12 and 13 that extend outwardly from the first and second opposite sides 114 and 115 of the airframe 112, respectively, a first nacelle 20 supported on the first wing 12, a second nacelle 30 supported on the second wing 13, a proprotor 40 disposed on each of the first and second nacelles 20 and 30 and a flight computer. The first and second wings 12 and 13 may be joined directly to one another as shown in FIGS. 2 and 3.

Figure 4:
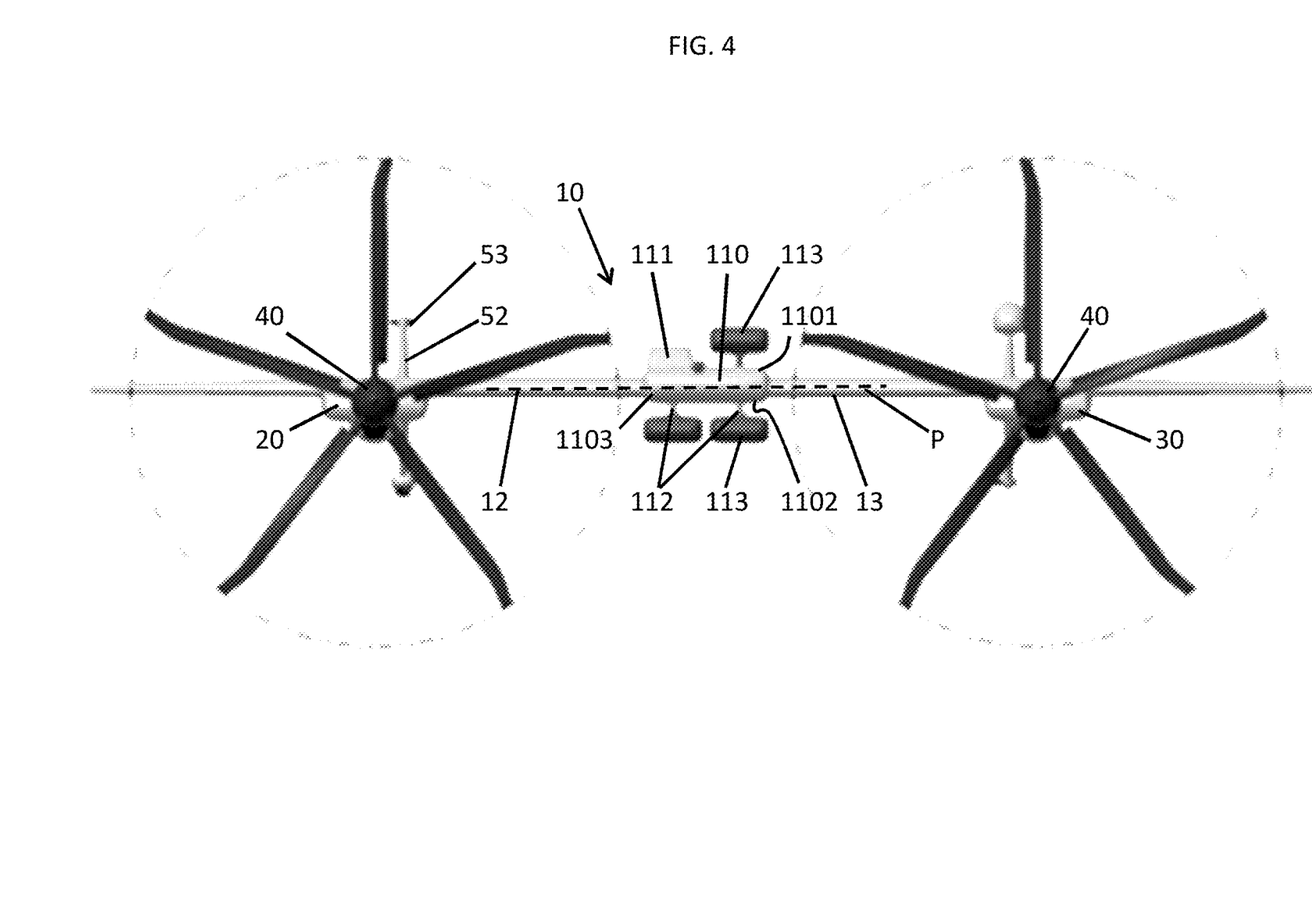
FIG. 4 is a front view of the VTOL aircraft of FIG. 1.
Figure 5:
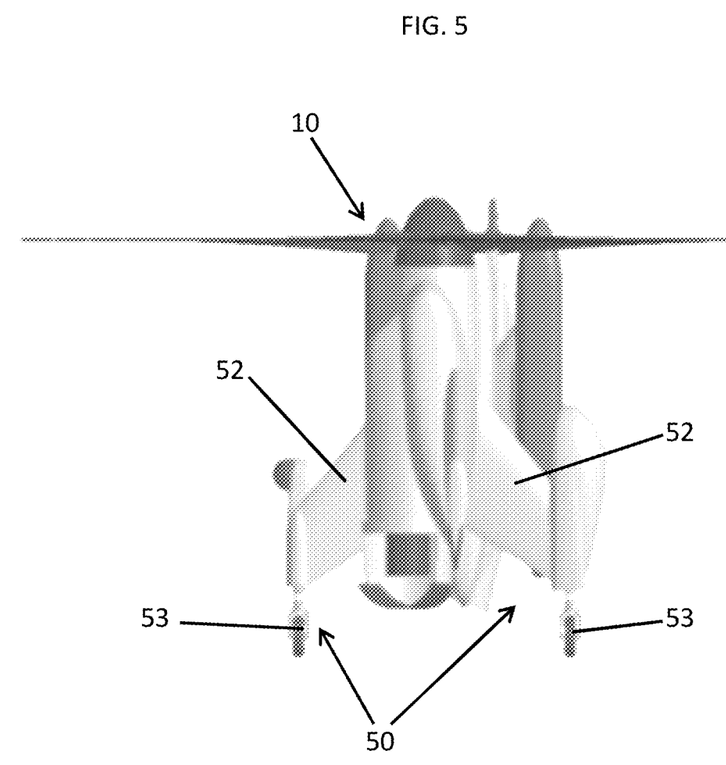
FIG. 5 is a side view of the VTOL aircraft of FIG. 1.

In accordance with embodiments, as shown in FIG. 4, the fuselage 11 includes a wing section 110 and a bulged section 111. The wing section 110 is generally elongate and disposed along a plane P of the first and second wings 12 and 13. The wing section 110 includes a top surface 1101 that protrudes above the top surface of the first and second wings 12 and 13, a bottom surface 1102 that protrudes below the bottom surface of the first and second wings 12 and 13, sidewalls 1103 and curved leading and trailing edges 1104 (see FIG. 1) where the top and bottom surfaces 1101, 1102 are joined. The bulged section 111 sits atop the top surface 1101 of the wing section 110 and is disposed to extend away from the plane P of the first and second wings 12 and 13. The bulged section 111 includes angled lead and trailing surfaces 1111, 1112 and sidewalls 1113.

With continued reference to FIG. 4, the fuselage 11 may further include a plurality of stores supports 112 and a plurality of external tank elements 113 where a number of the external tank elements 113 may but is not required to correspond to the number of the stores supports 112. The stores supports 112 may be coupled to the top and bottom surfaces 1101, 1102 of the wing section 110 and may be provided as standard weapons station components. The external tank elements 113 may be respectively coupled to respective distal ends of each of the stores supports 112. As shown in FIGS. 1, 3, 4 and 6, the stores supports 112 and the external tank elements 113 may be disposed on opposite sides of the plane P of the first and second wings 12 and 13 and, in accordance with embodiments, one stores support/tank element set may be disposed adjacent to the bulged section 111 at the top surface 1101 and two stores support/tank element sets may be arrayed at the bottom surface 1102.

Figure 3:
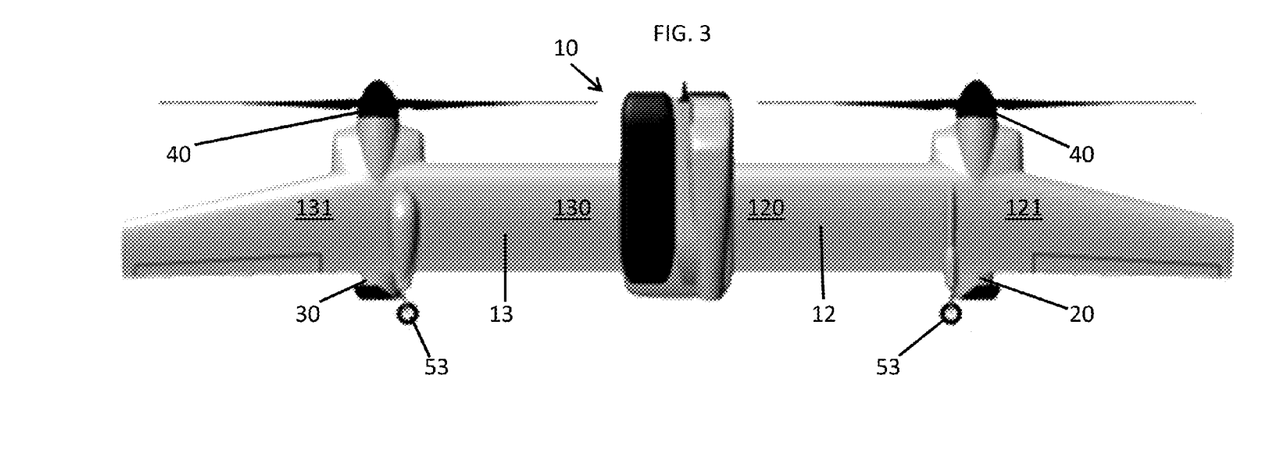
FIG. 3 is a top down view of the VTOL aircraft of FIG. 1.
Figure 6:
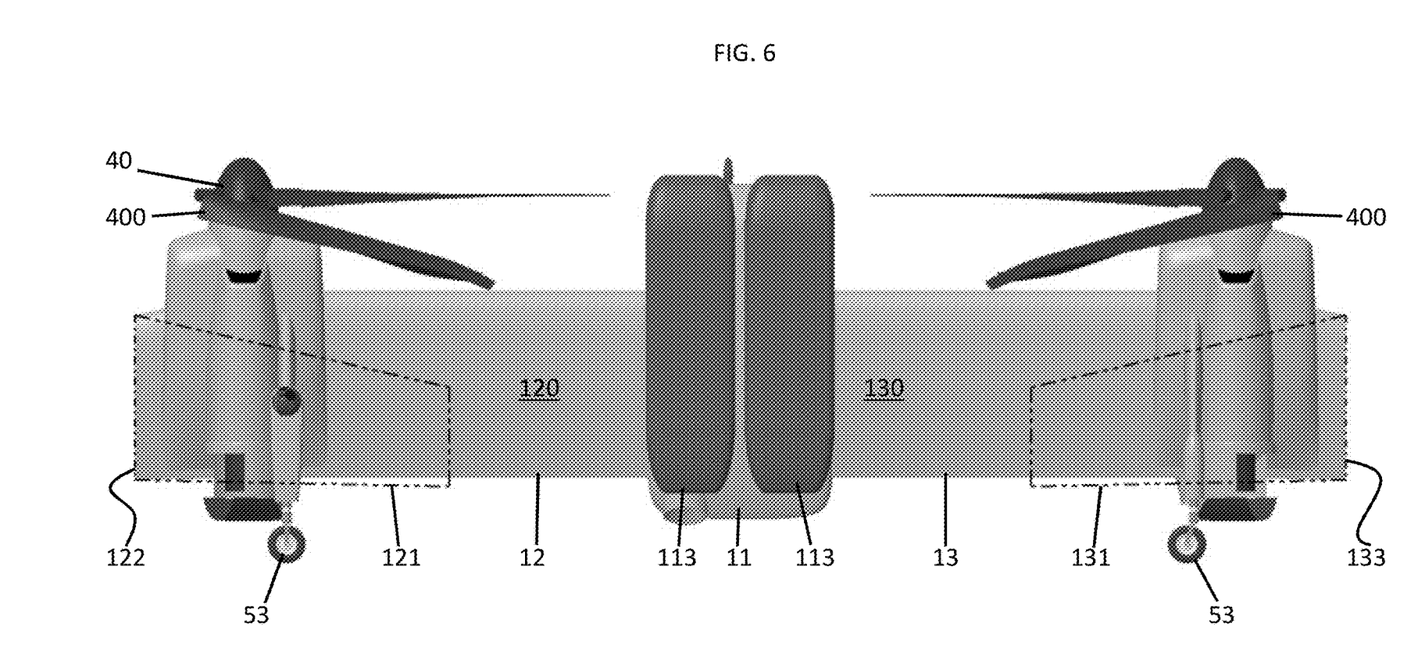
FIG. 6 is a top down view of the VTOL aircraft of FIG. 1 illustrating foldable wings.

As shown in FIGS. 3 and 6, each of the first and second wings 12 and 13 may include a main wing 120, 130, a winglet 121, 131 coupled to a distal end of the main wing 120, 130 and a hinge 122, 132 proximate to the first and second nacelles 20 and 30 by which the winglet 121, 131 is pivotable about the distal end of the main wing 120, 130. Thus, the first and second wings 12 and 13 may be foldable about the hinges 122, 132. In accordance with embodiments, the first and second wings 12 and 13 may be configured as high aspect ratio wings that have a span or longitudinal length that substantially exceeds a chord where the span or longitudinal length is measured from the first and second opposite sides 114 and 115 to distal tips of the first and second wings 12 and 13 and the chord is measured from the leading edges of the first and second wings 12 and 13 to the trailing edges of the first and second wings 12 and 13. In accordance with further embodiments, either or both of the leading edges and the trailing edges may be forwardly or rearwardly swept.

The first and second nacelles 20 and 30 are supported on each of the first and second wings 12 and 13 at about 40-60% span locations, respectively. The first and second nacelles 20 and 30 have an aerodynamic shape with forward sections, trailing end portions opposite from the forward sections and nacelle frames. The nacelle frame is generally smooth and formed and sized to encompass an engine unit or fuel/storage tanks formed and sized to encompass fuel, aircraft electronic components and/or payload elements.

The proprotors 40 are disposed at the forward sections of each of the first and second nacelles 20 and 30. Each of the proprotors 40 is drivable to rotate about only a single rotational axis, which is defined along and in parallel with a longitudinal axis of the corresponding one of the first and second nacelles 20 and 30. Power required for driving the rotations of the rotor propellers 40 may be generated from the engine unit and provided or transmitted via a direct or laterally oriented drive shaft.

Each proprotor 40 includes a hub and rotor blades that extend radially outwardly from the hub. As the rotor propellers 40 are driven to rotate, the rotor blades rotate about the rotational axes and aerodynamically interact with the surrounding air to generate lift and thrust for the aircraft 10 during vertical take-off and landing operations, hover operations and forward flight operations. The rotor blades are also controllable to pitch about respective pitch axes that run along their respective longitudinal lengths. Such rotor blade pitching can be commanded collectively or cyclically by at least the flight computer, which may be embodied in the aircraft electronic components of one or more of the fuselage 11 and the second nacelle 30. Collective pitching of the rotor blades increases or decreases an amount of lift and thrust the rotor propellers 40 generate for a given amount of applied torque. Cyclic pitching of the rotor blades provides for navigational and flight control of the aircraft 10.

Each of the rotor propellers 40 may be fully cyclically controllable by rotor controls (i.e., cyclic and collective functions using servo actuators, a swashplate and pitch change rod mechanisms) with signal inputs from a flight computer. This full cyclic control may be referred to as active proprotor control and permits the elimination of fixed wing controls (i.e., ailerons and elevons from the aircraft 10), which could lead to a further reduction in weight. In any case, the full cyclic control of the rotor propellers 40 allows the aircraft 10 to take off and land vertically with the node section 110 pointed upwardly while permitting a transition to wing borne flight. Such transition is effected by simply pitching the cyclic control forward to thereby cause the entire aircraft 10 to rotate from a vertical orientation to a horizontal orientation.

As also shown in FIG. 6, in order to reduce a footprint of the aircraft 10 beyond the footprint reduction offered by the foldable first and second wings 12 and 13, each of the rotor propellers 40 may include a set of rotor blades of which one or more may be once or twice foldable 400. Thus, when the aircraft 10 is grounded or not in flight, the first and second wings 12 and 13 and the foldable rotor blades 400 may assume their respective folded conditions.

In addition to the features described above and, with reference to FIGS. 3-6, the aircraft 10 may include alighting elements 50 coupled to the trailing end portions of each of the first and second nacelles 20 and 30. In accordance with embodiments, the alighting elements 50 may form at least a three-point or four-point, stable support system that supports in the aircraft 10 against rolling over in any given direction. Each of the alighting elements 50 may include a stores support 52 extending away from the plane P and an alighting support element 53 at a distal end of the stores support 52. The stores support 52 thus allows for a positioning of the alighting support element 53 away from exhaust from the engine unit.

With the configuration of the aircraft 10 described above, the aircraft 10 may include a refueling system 60 that includes at least one fuel tank 61 (see FIG. 2) and a refueling apparatus 62. As shown in FIG. 2, the at least one fuel tank 61 may be disposed in at least one or more of the external tank elements 113 of the fuselage 11, the first wing 12 or the second wing 13. The refueling apparatus 62 is coupled to the at least one fuel tank 61 such that fuel is movable with respect to the at least one fuel tank during aircraft ground and aerial operations. More particularly, the refueling apparatus 62 is coupled to the at least one fuel tank 61 such that fuel is injectable into the at least one fuel tank 61. Also, the refueling apparatus 62 is operable for fuel injection into the at least one fuel tank 61 during aircraft ground and aerial operations or for fuel transfer from the at least one fuel tank to a ground vehicle during aircraft ground operations.

Figure 1:
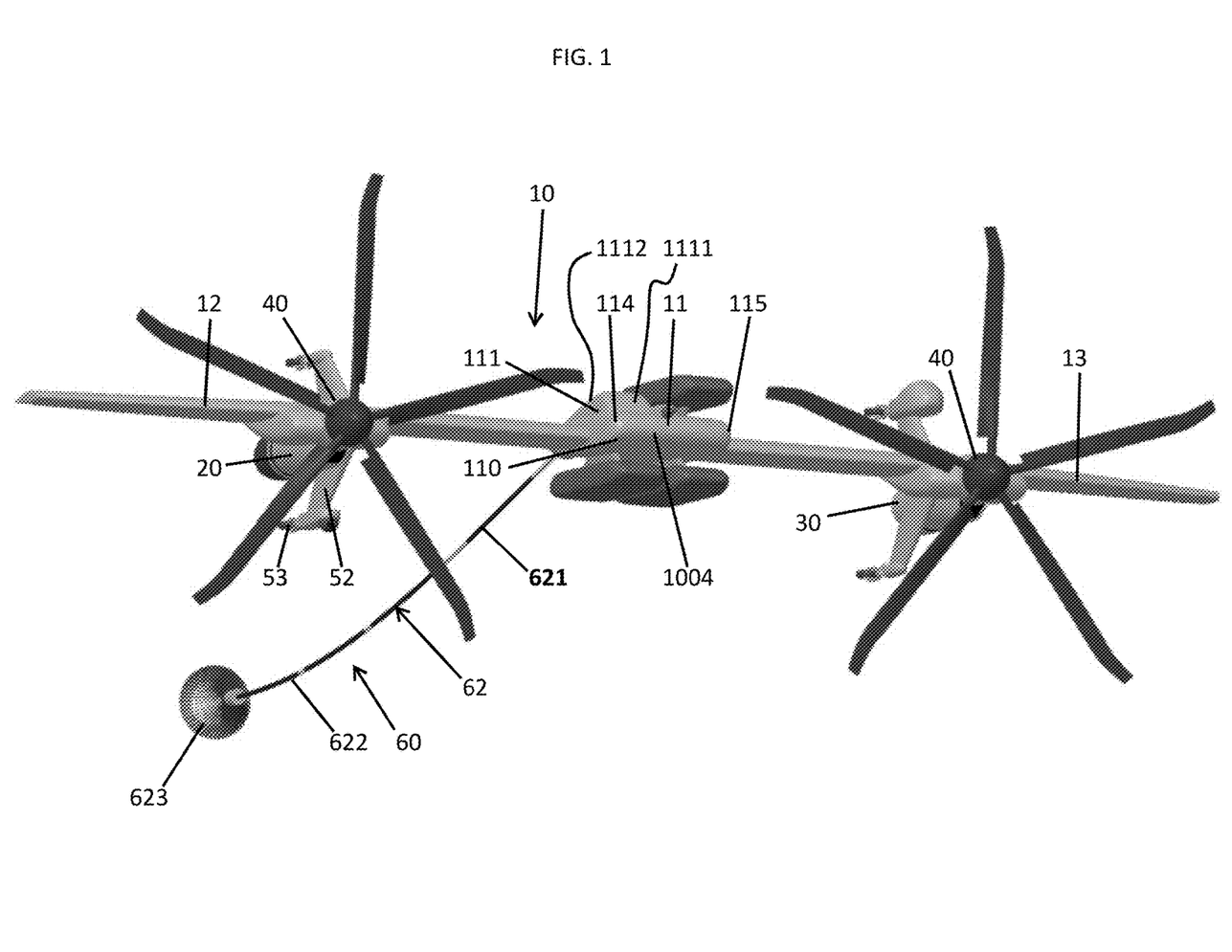
FIG. 1 is a perspective view of a vertical take-off and landing (VTOL) aircraft in accordance with embodiments.

Regarding the fuel injection of fuel into the at least one fuel tank 61 during the aircraft ground operations, the refueling apparatus 62 may include an inlet 620 that is fluidly communicative with the at least one fuel tank 61. With the aircraft 10 on the ground, a fuel nozzle can be inserted into the drogue 620 to facilitate the injection of the fuel directly into the at least one fuel tank 61. Alternatively, regarding the fuel injection of fuel into the at least one fuel tank 61 during aircraft aerial operations, as shown in FIG. 1, the refueling apparatus 62 may include a hose and drogue system 621 that is fluidly communicative with the at least one fuel tank 61. The hose and drogue system 621 may be housed in the fuselage 11 and, in some cases, in the bulged section 111 of the fuselage. The hose and drogue system 621 includes a hose 622 and a drogue 623 that is deployable from the fuselage 11 during aircraft aerial refueling operations to connect with a fuel supply contained within an in-flight fuel tanker.

In accordance with embodiments, upon initiation of deployment of the hose and drogue system 621, a window in the fuselage 11 is opened and the natural drag of the hose and drogue system 621 causes the hose and drogue system 621 to fully deploy in the rearward direction. Conversely, once refueling is complete, the hose and drogue system 621 can be drawn back into a stowed condition inside the fuselage 11 whereby the hose and drogue system 621 may be configured to collapse in on itself to save space within the fuselage 11 and possibly to permit a reduction in the size of the bulged section 111. In accordance with embodiments, the hose and drogue system 621 may include a single hose to perform airborne and ground refueling as well as a connector at the end of the hose to allow for interchangability of the drogue and its accompanying nozzle.

As also shown in FIG. 2, the aircraft 10 may include an auxiliary power unit (APU) 70. This APU 70 is disposed and configured to provide power to a fuel transfer operation whereby the fuel held in, for example, the at least one fuel tank 61 in the external tank element 113 can be transferred into the interior of the wing section 111 and then to the proprotors 40.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An aircraft, comprising:
    a fuselage;
    first and second wings extending outwardly from opposite sides of the fuselage;
    proprotors operably disposed on each of the first and second wings to drive vertical take-off and landing aircraft operations and horizontal flight aircraft operations;
    alighting elements disposed at a trailing side of the first and second wings for aircraft support during the ground operations; and
    a refueling system including at least one fuel tank disposed in at least one or more of the fuselage, the first wing or the second wing and a refueling apparatus,
    the refueling apparatus being coupled to the at least one fuel tank such that fuel is movable with respect to the at least one fuel tank during aircraft ground and aerial operations.

2. The aircraft according to claim 1, wherein each of the first and second wings comprises:
    a main wing;
    a winglet coupled to a distal end of the main wing; and
    a hinge by which the winglet is pivotable about the distal end of the main wing.

3. The aircraft according to claim 1, wherein the proprotors comprise foldable rotor blades.

4. The aircraft according to claim 1, wherein the fuselage comprises:
   a wing section disposed along a plane of the first and second wings; and
   a bulged section disposed to extend away from the plane.

5. The aircraft according to claim 4, wherein the fuselage further comprises:
   a stores support coupled to the wing section; and
   an external tank element coupled to a distal end of the stores support.

6. The aircraft according to claim 5, wherein the fuselage comprises a plurality of stores supports and a corresponding number of external tank elements.

7. The aircraft according to claim 6, wherein the plurality of the stores supports and the corresponding number of the external tank elements are arrayed on opposite sides of the plane.

8. The aircraft according to claim 4, wherein the refueling apparatus comprises an inlet fluidly communicative with the at least one fuel tank.

9. The aircraft according to claim 4, wherein the refueling apparatus comprises a hose and drogue system fluidly communicative with the at least one fuel tank.

10. The aircraft according to claim 9, wherein the hose and drogue system is housed in or on the fuselage.

11. The aircraft according to claim 1, further comprising an auxiliary power unit configured to power a fuel transfer between the at least one fuel tank and the refueling apparatus.

12. An aircraft, comprising:
   a fuselage;
   first and second wings extending outwardly from opposite sides of the fuselage;
   proprotors operably disposed on each of the first and second wings to drive vertical take-off and landing aircraft operations and horizontal flight aircraft operations;
   alighting elements disposed at a trailing side of the first and second wings for aircraft support during the ground operations; and
   a refueling system including at least one fuel tank disposed in at least one or more of the fuselage, the first wing or the second wing and a refueling apparatus,
   the refueling apparatus being coupled to the at least one fuel tank such that fuel is movable with respect to the at least one fuel tank during aircraft ground and aerial operations and comprising:
   an inlet fluidly communicative with the at least one fuel tank; and
   a hose and drogue system fluidly communicative with the at least one fuel tank.

13. The aircraft according to claim 12, wherein the fuselage comprises:
   a wing section disposed along a plane of the first and second wings;
   a bulged section disposed to extend away from the plane;
   a plurality of stores supports coupled to opposite sides of the wing section; and
   a plurality of external tank elements respectively coupled to respectively distal ends of each of the stores supports.

14. The aircraft according to claim 12, wherein the hose and drogue system is housed in or on the fuselage.

* * * * *